United States Patent
Marshall et al.

(10) Patent No.: US 9,994,673 B2
(45) Date of Patent: Jun. 12, 2018

(54) BISPHENOL POLYETHER OLIGOMERS, METHODS OF MANUFACTURE, AND POLYCARBONATES MADE THEREFROM

(71) Applicant: SABIC GLOBAL TECHNOLOGIES B.V, Bergen op Zoom (NL)

(72) Inventors: Jill Ellen Marshall, Evansville, IN (US); Robert Russell Gallucci, Mount Vernon, IN (US); James Alan Mahood, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days. days.

(21) Appl. No.: 14/862,709

(22) Filed: Sep. 23, 2015

(65) Prior Publication Data

US 2016/0009859 A1    Jan. 14, 2016

Related U.S. Application Data

(63) Continuation of application No. 14/143,361, filed on Dec. 30, 2013, now abandoned.

(51) Int. Cl.
| | | |
|---|---|---|
| *C08G 64/12* | (2006.01) | |
| *C08G 65/40* | (2006.01) | |
| *C08G 64/06* | (2006.01) | |
| *C08G 64/08* | (2006.01) | |
| *C08K 5/524* | (2006.01) | |

(52) U.S. Cl.
CPC .......... *C08G 64/06* (2013.01); *C08G 64/081* (2013.01); *C08G 64/12* (2013.01); *C08G 65/40* (2013.01); *C08K 5/524* (2013.01)

(58) Field of Classification Search
CPC ............................ C08G 64/12; C08G 64/183
See application file for complete search history.

(56) References Cited

U.S. PATENT DOCUMENTS

| | | |
|---|---|---|
| 3,203,926 A | 8/1965 | Deanin et al. |
| 3,205,198 A | 9/1965 | Deanin et al. |
| 3,305,520 A | 2/1967 | Fritz et al. |
| 3,379,801 A | 4/1968 | Conix et al. |
| 4,108,837 A | 8/1978 | Johnson et al. |
| 4,175,175 A | 11/1979 | Johnson et al. |
| 4,220,805 A | 9/1980 | Carnahan |
| 4,371,709 A | 2/1983 | Steffen et al. |
| 4,395,537 A | 7/1983 | Yonezawa et al. |
| 4,510,334 A | 4/1985 | Glembin et al. |

(Continued)

FOREIGN PATENT DOCUMENTS

| | | |
|---|---|---|
| EP | 0383725 A2 | 8/1990 |
| EP | 2316877 A2 | 5/2011 |

(Continued)

OTHER PUBLICATIONS

Rosato, D. V.; Rosato, D. V.; Rosato, M. G. Injection Molding Handbook. 2000. Springer Science+Business Media New York. pp. 606-611. (Year: 2000).*
Brunelle, "Polycarbonates", Encyclopedia of Polymer Science and Technology. John Wiley & Sons, Inc., 2006, pp. 1-33.
Cameron et al., "Polyether Synthesis by Phase Transfer Catalysed Polymerization", Makromol. Chem., Rapid Commun. 3, 1982, pp. 99-102.
Hay, et al., "Oliogmer and Polymers of Polyethers and Polyformals", Journal of Macromolecular Science, Chemistry, 1984, vol. 21, pp. 1065-1079.
International Search Report for PCT/US2012/051561, International Application Filing Date Aug. 20, 2012, dated Feb. 13, 2013, 6 pages.
Jang, et al., "The thermal degradation of bisphenol a polycarbonate in air", Thermochimica Acta. 2005, vol. 426, pp. 73-84.

(Continued)

*Primary Examiner* — Stephen E Rieth
(74) *Attorney, Agent, or Firm* — Cantor Colburn LLP

(57) ABSTRACT

A bisphenol polyether oligomer composition comprising greater than 90 wt. % of an oligomer of the formula

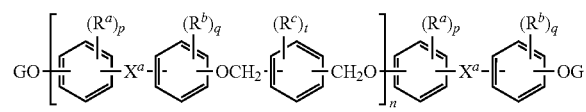

wherein $R^a$, $R^b$, and $R^c$ are each independently a $C_{1-12}$ alkyl, $C_{1-12}$ alkoxy, or $C_{1-12}$ alkylarylene,
each $X^a$ is independently a single bond, —O—, —S—, —S(O)—, —S(O)_2—, —C(O)—, or a $C_{1-18}$ organic group,
G is H or

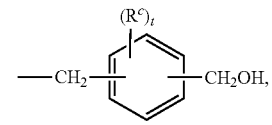

p, q, and t are each independently integers of 0 to 4, n is 1 to 10; and wherein the bisphenol polyether oligomer composition comprises: a total halide content of less than 1000 ppm, less than 1000 ppm of —CH$_2$OH groups, less than 5 wt. % cyclic oligomers, and less than 100 ppm of a bisphenol of the formula

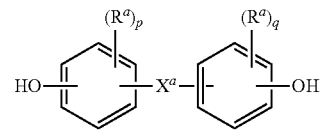

wherein $R^a$, $R^b$, $X^a$, p and q are the same as in the oligomer.

15 Claims, No Drawings

(56) References Cited

U.S. PATENT DOCUMENTS

| | | |
|---|---|---|
| 4,849,503 A | 7/1989 | Cotter et al. |
| 4,939,199 A | 7/1990 | Cotter et al. |
| 4,950,731 A | 8/1990 | Faler et al. |
| 5,229,482 A | 7/1993 | Brunelle |
| 5,494,997 A | 2/1996 | Fontana et al. |
| 5,830,988 A | 11/1998 | Chan |
| 5,969,079 A | 10/1999 | Lubowitz et al. |
| 6,469,127 B1 | 10/2002 | Furunaga et al. |
| 6,630,568 B1 | 10/2003 | Johnson et al. |
| 7,393,914 B2 | 7/2008 | Moore et al. |
| 7,563,817 B2 | 7/2009 | Ganesan et al. |
| 7,705,190 B2 | 4/2010 | Brunelle |
| 2003/0149223 A1 | 8/2003 | McCloskey et al. |
| 2005/0192424 A1 | 9/2005 | Shafer et al. |
| 2005/0222334 A1 | 10/2005 | Srinivasan et al. |
| 2005/0288517 A1 | 12/2005 | Rai et al. |
| 2006/0135741 A1 | 6/2006 | Gui et al. |
| 2007/0049723 A1 | 3/2007 | Goossens |
| 2007/0197700 A1 | 8/2007 | Gallucci et al. |
| 2009/0326107 A1 | 12/2009 | Bittner |
| 2011/0168657 A1 | 7/2011 | Bittner |
| 2012/0123083 A1 | 5/2012 | Nunome et al. |
| 2013/0052381 A1 | 2/2013 | Gallucci et al. |
| 2013/0053487 A1 | 2/2013 | Gallucci et al. |
| 2013/0053489 A1 | 2/2013 | Gallucci et al. |

FOREIGN PATENT DOCUMENTS

| | | | |
|---|---|---|---|
| GB | 1341318 A | * 12/1973 | ............. C08G 64/06 |
| JP | 2001019741 A | 1/2001 | |
| JP | 2003176348 A | 6/2003 | |
| JP | 2004010874 A | 1/2004 | |
| JP | 2009114417 A | 5/2009 | |
| WO | 2012091701 A1 | 7/2012 | |
| WO | 2012160172 A1 | 11/2012 | |
| WO | 2013028607 A1 | 2/2013 | |
| WO | 2013028609 A1 | 2/2013 | |
| WO | 2013028610 A1 | 2/2013 | |
| WO | 2013028719 A1 | 2/2013 | |

OTHER PUBLICATIONS

Kitamura et al., "Comparative Study of the Endocrine-Disrupting Activity of Bisphenol A and 19 Related Compounds", Toxicological Sciences 84, 2005, pp. 249-259.

Lee et al., "Synthesis of new poly(aryl ether)s with pendent benzoxazole groups via Ullmann ether reaction", Die Angewandte Makromolekulare Chemie 254 (1998) pp. 27-32 (Nr. 4397).

N'Guyen et al., "Synthesis of Polyethers by Phase Transfer Catalyzed Polycondensation", American Chemical Society, vol. 23, No. 1, 1982, 3 pages.

Pryde et al., "The Hydrolytic Stability of Some Commercially Available polycarbonates", Polymer Engineering and Science, Apr. 1992, vol. 22, No. 6, pp. 370-375.

Sen et al., "Spiro-biindane containing fluorinated poly(etherimide)s: Synthesis, characterization and gas separation properties", Journal of Membrane Science 365, 2010, pp. 329-340.

Tezuka et al., "Novel Metabolic Pathways of p-n-Nonylphenol Catalyzed by Cytochrome P450 and Estrogen Receptor Binding Activity of New Metabolites", Journal of Health Science, 53(5), 2007, pp. 552-561.

Yamazaki et al., "Phase-Transfer Catalyzed Polycondensation of a,a', Dichloro-p-xylene with 2,2-Bis(4-hydroxyphenyl)propane", Polymer Journal, vol. 15, No. 8, 1983, pp. 603-608.

* cited by examiner

BISPHENOL POLYETHER OLIGOMERS, METHODS OF MANUFACTURE, AND POLYCARBONATES MADE THEREFROM

CROSS REFERENCED TO RELATED APPLICATION

This application is a continuation application of U.S. patent application Ser. No. 14/143,361, filed on Dec. 30, 2013, which is incorporated by reference herein in its entirety.

BACKGROUND

This disclosure relates to bisphenol polyether oligomers, polycarbonates made from the bisphenol polyether oligomers, methods for their manufacture, and uses thereof.

Polycarbonates are useful in a wide variety of applications at least in part because of their good balance of properties, such as moldability, heat resistance and impact properties among others. Polycarbonates can be manufactured through a transesterification reaction of an aromatic dihydroxy monomer and a carbonyl source under melt or interfacial polymerization conditions.

While polycarbonates of different formulations and grades are commercially available, there remains a need for polycarbonate with residual monomer (if any) and with hydrolytic or thermolytic degradation products that exhibit certain beneficial characteristics.

SUMMARY

Disclosed herein is a bisphenol polyether oligomer composition comprising greater than 90 wt. % of an oligomer of the formula

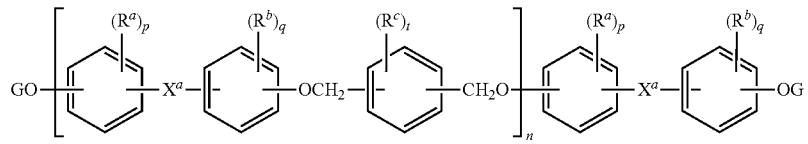

wherein
$R^a$, $R^b$, and $R^c$ are each independently a $C_{1-12}$ alkyl, $C_{1-12}$ alkoxy, or $C_{1-12}$ alkylarylene,
each $X^a$ is independently a single bond, —O—, —S—, —S(O)—, —S(O)_2—, —C(O)—, or a $C_{1-18}$ organic group,
G is H or

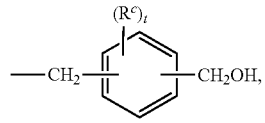

p, q, and t are each independently integers of 0 to 4,
n is 1 to 10; and
wherein the bisphenol polyether oligomer composition comprises:
a total halide content of less than 1000 ppm,
less than 1000 ppm of —CH$_2$OH groups,
less than 5 wt. % cyclic oligomers, and
less than 100 ppm of a bisphenol of the formula

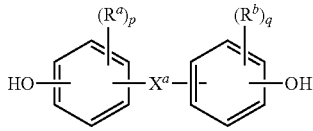

wherein $R^a$, $R^b$, $X^a$, p and q are the same as in the oligomer.
Also disclosed is a polyether polycarbonate comprising repeating carbonate unit of the formula

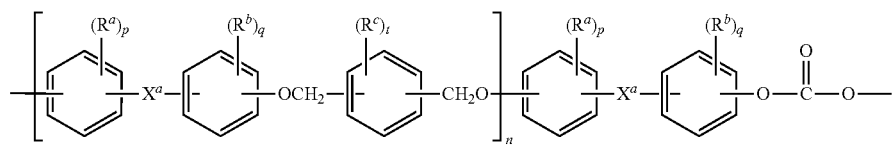

wherein $R^a$, $R^b$, and $R^c$ are each independently a $C_{1-18}$ alkyl, $C_{1-18}$ alkoxy or alkylarylene, each occurrence of $X^a$ is independently single bond, —O—, —S—, —S(O)—, —S(O)$_2$—, —C(O)—, or a $C_{1-18}$ organic group, p, q, and t are each independently integers of 0 to 4; and n is 1 to 10.

A polyether polycarbonate composition comprising the polyether polycarbonate is also disclosed.

In yet another embodiment, an article comprises the above-described polyether polycarbonate composition.

In still another embodiment, a method of manufacture of an article comprises molding, extruding, or shaping the above-described polyether polycarbonate composition into an article.

The above described and other features are exemplified by the following drawings, detailed description, examples, and claims.

DETAILED DESCRIPTION

The present disclosure provides polycarbonates, which when exposed to degradation conditions, for example conditions for thermolysis or hydrolysis of the polycarbonates, produce hydrostable degradants that have low or no binding affinities at estradiol sites. The polycarbonates are derived from bisphenol polyether oligomer compositions, which in turn can be prepared from bisphenols and dihaloxylenes.

The bisphenol polyether oligomer compositions comprise greater than 90 wt. % of oligomers of formula (1)

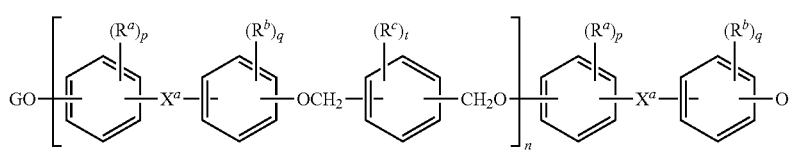

(1)

wherein $R^a$, $R^b$, and $R^c$ are each independently a $C_{1-12}$ alkyl, $C_{1-12}$ alkoxy, or $C_{1-12}$ alkylarylene; and n is 1 to 10; and p, q, and t are each independently integers of 0 to 4. It will be understood that when p, q, or t is less than 4, the valence of each carbon of the ring is filled by hydrogen. Further in formula (1), G is H or

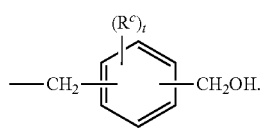

Also in formula (1), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene, a $C_{3-18}$ cycloalkylene, a fused $C_{6-18}$ cycloalkylene, or a group of the formula —B$^1$-G'-B$^2$— wherein B$^1$ and B$^2$ are the same or different $C_{1-6}$ alkylene and G' is a $C_{3-12}$ cycloalkylidene or a $C_{6-16}$ arylene. For example, $X^a$ can be a substituted $C_{3-18}$ cycloalkylidene of formula (2)

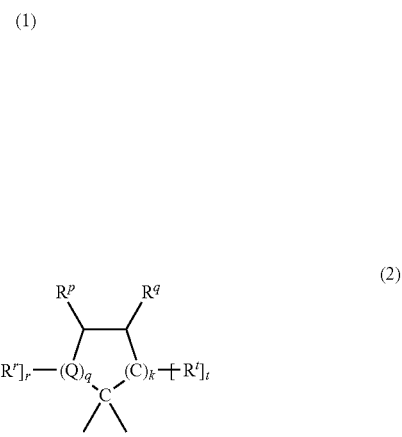

(2)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (2) will have an unsaturated carbon-carbon linkage where the ring is fused. When k is one and (I) is 0, the ring as shown in formula (2) contains 4 carbon atoms, when k is 2, the ring as shown in formula (2) contains 5 carbon atoms, and when k is 3, and the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

In addition to greater than 90 wt. % of oligomers of formula (1), the bisphenol polyether oligomer compositions are characterized by having a total halide (F, Cl, Br, and I) content of less than 1000 parts per million by weight (ppm) based on the total parts by weight of the composition, including 0 to 999 ppm, 0 to 900 ppm, 1 to 800 ppm, 1 to 700 ppm, or 5 to 500 ppm, each based on the total parts by weight of the composition.

The bisphenol polyether oligomer compositions are further characterized by having less than 1000 ppm of —CH$_2$OH groups based on the total parts by weight of the composition, including 0 to 999 ppm, 0 to 900 ppm, 1 to 800 ppm, 1 to 700 ppm, or 5 to 500 ppm, each based on the total parts by weight of the composition. Content of —CH$_2$OH groups can be determined, for example, by infrared spectroscopy, nuclear magnetic resonance spectroscopy, or titration.

The bisphenol polyether oligomer compositions are still further characterized by having less than 5 wt. % cyclic oligomers based on the total weight of the composition, including 0 to 4.9 wt. %, 0 to 4.0 wt. %, 0.001 to 3.0 wt. %, each based on the total weight of the composition. Cyclic oligomers are of the formula

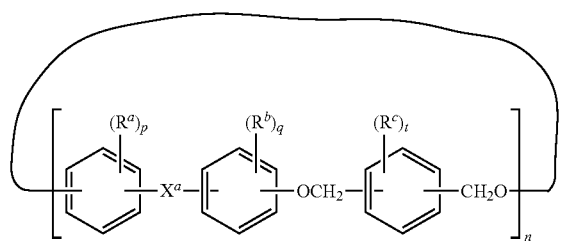

wherein n is 1 or greater, e.g., 1 to 4 and $R^a$, $R^b$, $R^c$, $X^a$, and p, q and t are as defined above.

The bisphenol polyether oligomer compositions are still further characterized by having less than 100 ppm of a bisphenol of formula (3)

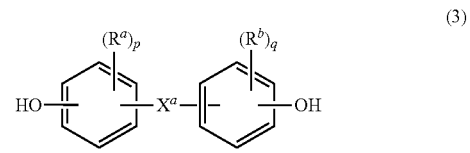

wherein $R^a$, $R^b$, $X^a$, p and q are the same as in the oligomer of formula (1). In an embodiment, the bisphenol polyether oligomer compositions comprise 0 to less than 100 ppm of the bisphenol of formula (3) based on the total parts by weight of the oligomer composition, or 0 to 90 ppm or 0 to 80 ppm, or 1 to 50 ppm, each based on the total parts by weight of the oligomer composition. The bisphenol of formula (3) corresponds to the bisphenol used to manufacture the polyether oligomers, as explained in more detail below.

A specific bisphenol polyether oligomer composition comprises an oligomer of formula (1a)

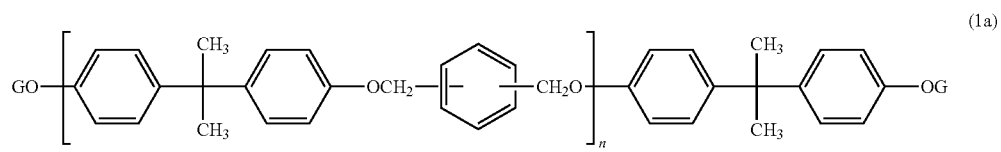

wherein n is 1 to 10, G is H or

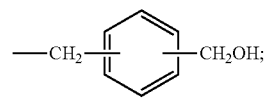

a total halide content of less than 1000 ppm, less than 1000 ppm of —CH$_2$OH groups, less than 5 wt. % cyclic oligomers, and less than 100 ppm of a bisphenol wherein the bisphenol is bisphenol A.

An example of a bisphenol polyether oligomer composition wherein $X^a$ is a substituted $C_{3-18}$ cycloalkylidene comprises a bisphenol polyether phthalimidine oligomer of formula (1b)

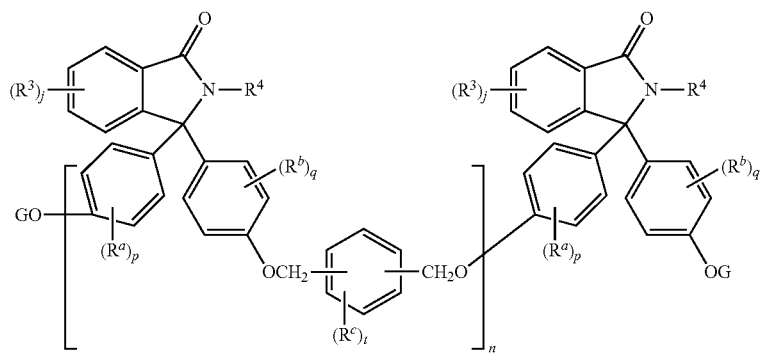

wherein $R^a$, $R^b$, $R^c$, G, p, q, t, and n are the same as in formula (1), $R^3$ is each independently a $C_{1-6}$ alkyl, j is 0 to 4, and $R^4$ is hydrogen, $C_{1-6}$ alkyl, or a substituted or unsubstituted phenyl, for example a phenyl substituted with up to five $C_{1-6}$ alkyls; a total halide content of less than 1000 ppm; less than 1000 ppm of —$CH_2OH$ groups; less than 5 wt. % cyclic oligomers; and less than 100 ppm of a bisphenol wherein the bisphenol is of formula (3b)

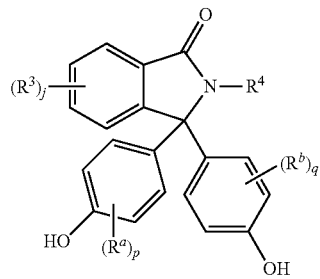

wherein $R^a$, $R^b$, $R^3$, $R^4$, p, q, and j are the same as in formula (1b). In an embodiment, in formulas (1b) and (3b), $R^4$ is hydrogen, phenyl optionally substituted with up to five $C_{1-6}$ alkyls, or $C_{1-4}$ alkyl. In an embodiment, $R^4$ is hydrogen, methyl, or phenyl, specifically phenyl; and p, q, j, and t are 0.

Other exemplary bisphenol polyether oligomer compositions comprise greater than 90 wt. % of bisphenol polyether oligomers of formula (1c)

wherein n is 1 to 10, G is H or

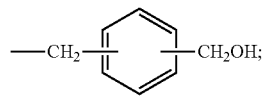

a total halide content of less than 1000 ppm; less than 1000 ppm of —$CH_2OH$ groups; less than 5 wt. % cyclic oligomers; and less than 100 ppm of a bisphenol wherein the bisphenol is of formula 3(c).

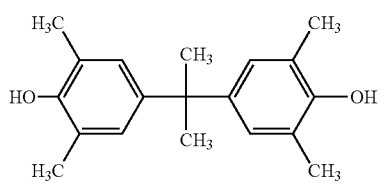

Still other exemplary bisphenol polyether oligomer compositions comprise greater than 90 wt. % of bisphenol polyether oligomers of formula (1d)

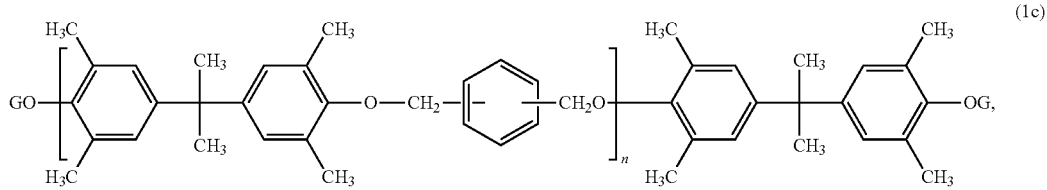

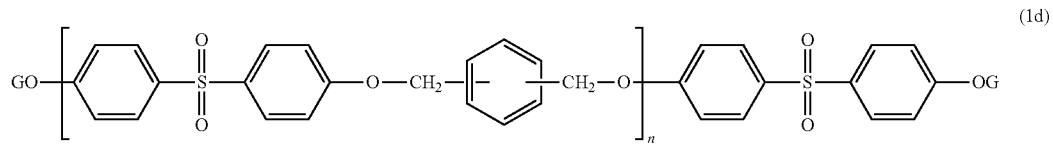

wherein n is 1 to 10, G is H or

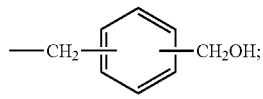

a total halide content of less than 1000 ppm; less than 1000 ppm of —CH$_2$OH groups; less than 5 wt. % cyclic oligomers; and less than 100 ppm of a bisphenol wherein the bisphenol is of formula 3(d).

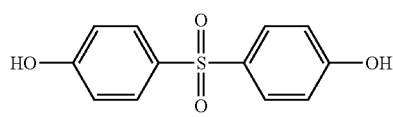

As described in further detail below, the bisphenol polyether oligomers are derived by reaction of a bisphenol. Bisphenols can be specifically mentioned are 3,3-bis(4-hydroxyphenyl)-2-phenylisoindolin-1-one), 1,1-bis(4-hydroxy-3-methylphenyl)cyclohexane (DMBPC), and 1,1-bis(4-hydroxy-3-methylphenyl)-3,3,5-trimethylcyclohexane (isophorone bisphenol.

Other specific bisphenols that can be used to manufacture the bisphenol polyether oligomers include, but are not limited to, 4,4'-dihydroxybiphenyl, bis(4-hydroxyphenyl) methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, 9,9-bis(4-hydroxyphenyl)fluorene, 3,3-bis(4-hydroxyphenyl) phthalimide, or the like.

As in other embodiments, the bisphenol polyether compositions manufactured using any of the foregoing bisphenols comprise greater than 90 wt. % of the bisphenol polyether oligomer having 1 to 10 repeat units, wherein the endgroups G are H or

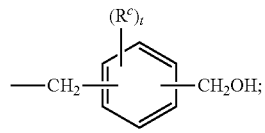

a total halide content of less than 1000 ppm; less than 1000 ppm of —CH$_2$OH groups; less than 5 wt. % cyclic oligomers; and less than 100 ppm of the bisphenol.

A combination of two or more different bisphenols can be present in the oligomers. In these embodiments, the total number of repeat polyether units is 1 to 10, where the number of individual units varies depending on the concentration and reactivity of each bisphenol. As in other embodiments, the bisphenol polyether compositions manufactured using a combination of two or more different bisphenols comprise greater than 90 wt. % of the bisphenol polyether oligomer having 1 to 10 repeat units, wherein the endgroups G are H or

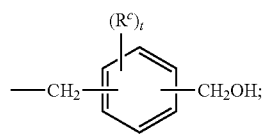

a total halide content of less than 1000 ppm; less than 1000 ppm of —CH$_2$OH groups; less than 5 wt. % cyclic oligomers; and less than 100 ppm of the bisphenols.

An example of a bisphenol polyether composition manufactured using a combination of two different bisphenols comprises greater than 90 wt. % of a bisphenol A-phthalimidine polyether oligomer of the formula (1e)

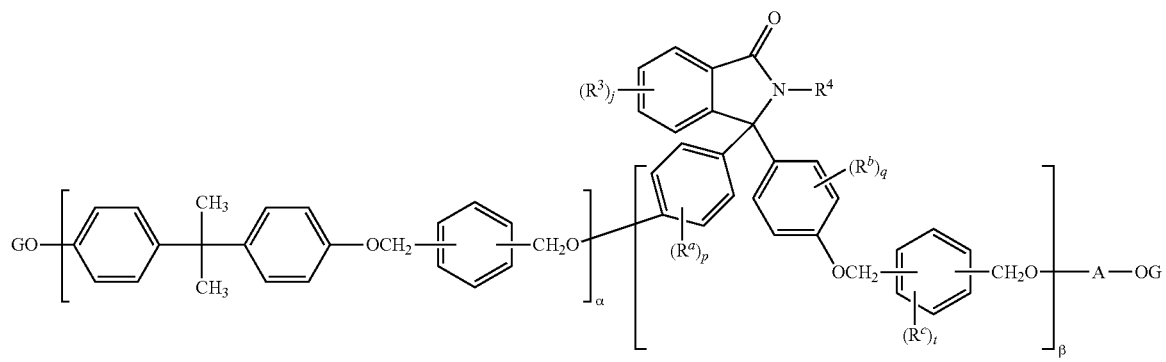

wherein $R^a$, $R^b$, and $R^c$ are each independently a $C_{1-12}$ alkyl, $C_{1-12}$ alkoxy, or $C_{1-12}$ alkylarylene, $R^3$ is each independently a $C_{1-6}$ alkyl, $R^4$ is hydrogen, $C_{1-6}$ alkyl, or a substituted or unsubstituted phenyl, p, q, j, and t are each independently integers of 0 to 4, α is 1 to 10 and β is 1 to 10, provided that α+β is 2 to 10, G is H or

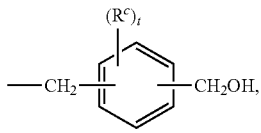

and A is

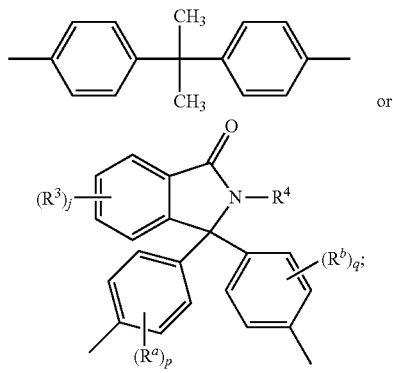

and
wherein the bisphenol is bisphenol A, a bisphenol of formula (3b), wherein $R^a$, $R^b$, $R^3$, $R^4$, p, q, and j are the same as defined for formula (3b), or a combination of bisphenol A and a bisphenol of formula (3b).

The bisphenol polyether oligomers can be prepared by reacting the bisphenol of formula (3)

(3)

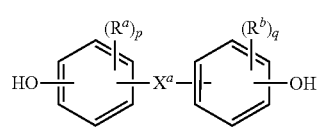

with an aromatic dihalide of formula (4)

(4)

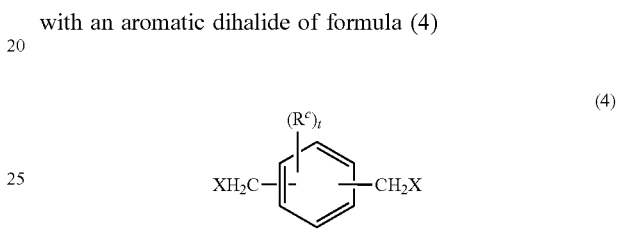

in the presence of an alkaline metal salt, for example, sodium hydroxide, potassium hydroxide, or a combination thereof wherein $R^a$, $R^b$, $R^c$, $X^a$, p, q, and t are as defined in formula (1), and X is Cl or Br.

Specific examples of aromatic dihalides of formula (4) include α, α'-dibromo-p-xylene, α, α'-dichloro-p-xylene, di(chloromethyl)benzenes, and combinations comprising at least one of the foregoing.

The conditions for the synthesis can vary widely depending on the reactants. In general the synthesis is carried out with agitation in an inert solvent, for example, chlorobenzene, toluene, benzene, and the like, specifically a polar aprotic solvent such as dimethyl sulfoxide, sulfolane, tetrahydrofuran, N-methyl pyrrolidinone, N,N-dimethyl acetamide, and the like. The reaction can be conducted at atmospheric or higher pressure, and at an elevated temperature, for example 30 to 180° C. In some embodiments the reaction is conducted with less than 100 ppm of water present.

The bisphenol polyether oligomers can have a weight average molecular weight of 300 to 5000 Daltons, specifically 500 to 2,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In a particularly advantageous feature, the bisphenol polyether oligomers are hydrolytically stable, particularly under conditions that can degrade polycarbonates as described in further detail below. Without wishing to be bound by theory, it is believed that the bisphenol polyether oligomers show very low or no estradiol-like binding activity because they are highly insoluble in biological systems, and therefore do not reach high concentrations in such systems; and because they are too large to fit into estradiol binding sites.

The lack of significant estradiol-like binding activity can be characterized by a determination of their half maximal inhibitory concentration (IC$_{50}$) for alpha or beta in vitro estradiol receptors. As used herein, the term half maximal inhibitory concentration (IC$_{50}$) is a quantitative measure that indicates how much of a particular substance, i.e., an inhibitor, is needed to inhibit a given biological process or component of a process, by one half. In other words, it is the half maximal (50%) inhibitory concentration (IC) of a substance (50% IC, or IC$_{50}$). It is commonly known to one of ordinary skill in the art and used as a measure of antagonist drug potency in pharmacological research. The (IC$_{50}$) of a particular substance can be determined using conventional competition binding assays. In this type of assay, a single concentration of radioligand (such as an agonist) is used in every assay tube. The ligand is used at a low concentration, usually at or below its K$_d$ value. The level of specific binding of the radioligand is then determined in the presence of a range of concentrations of other competing non-radioactive compounds (usually antagonists), in order to measure the potency with which they compete for the binding of the radioligand. Competition curves may also be computer-fitted to a logistic function as described under direct fit. The IC$_{50}$ is the concentration of competing ligand which displaces 50% of the specific binding of the radioligand.

The bisphenol polyether compositions do not exhibit a half maximal inhibitory concentration (IC$_{50}$) less than 0.0025 M for alpha and/or beta in vitro estradiol receptors. The upper range of the IC$_{50}$ is not particularly limited, and in some embodiments cannot exceed the solubility limit of the bisphenol polyether compositions in the aqueous test solutions. In other embodiments, the bisphenol polyether compositions do not exhibit a half maximal inhibitory concentration (IC$_{50}$) less than 0.00025 M or greater than 0.001 M, for alpha and/or beta in vitro estradiol receptors.

The bisphenol polyether oligomer compositions can be used to prepare polycarbonates. "Polycarbonate" as used herein means a polymer comprising repeating structural carbonate units of formula (5)

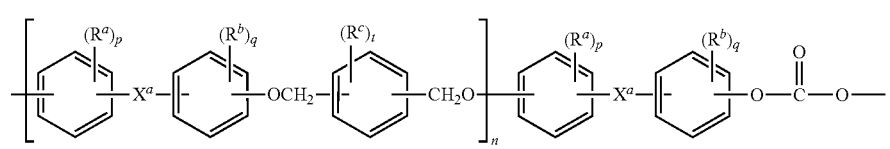

(5)

wherein R$^a$, R$^b$, R$^c$, p, q, t, and n are the same as defined in formula (1). In an embodiment, the polycarbonate comprises 5 to 500 or 5 to 200 repeating structural carbonate units of formula (5). The polycarbonate can have an Mw of 3,000 to 80,000 Daltons, a phenolic end group content less than 20 meq/kg, a total chloride content less than 50 ppm, a transition metal content less than 50 ppm, and a residual phenolic monomer content less than 100 ppm.

In specific embodiments, the polycarbonate comprises repeating structural carbonate units of formula (5a), formula (5b), formula (5c), formula (5d), or formula (5e)

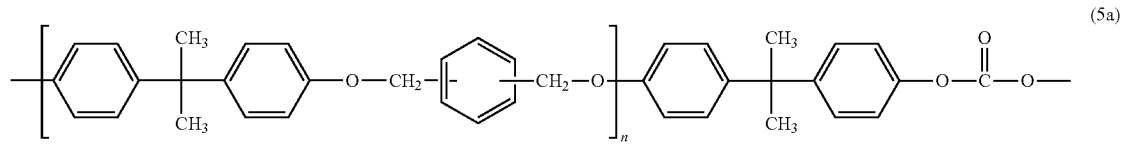

(5a)

wherein n is 1 to 10;

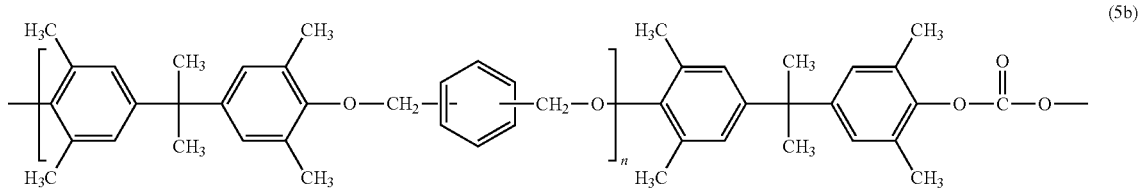

(5b)

wherein n is 1 to 10;

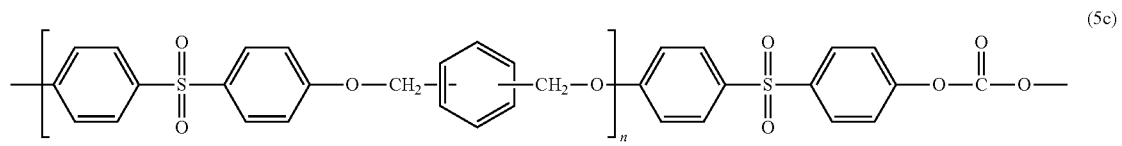

(5c)

wherein n is 1 to 10;

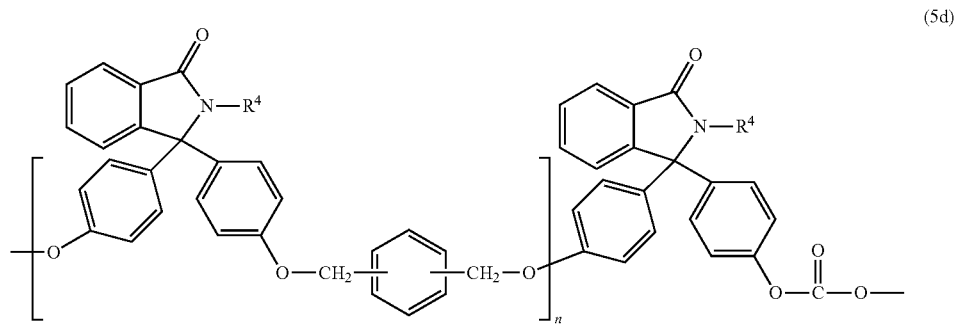

(5d)

wherein $R^4$ is phenyl or methyl and n is 1 to 10;

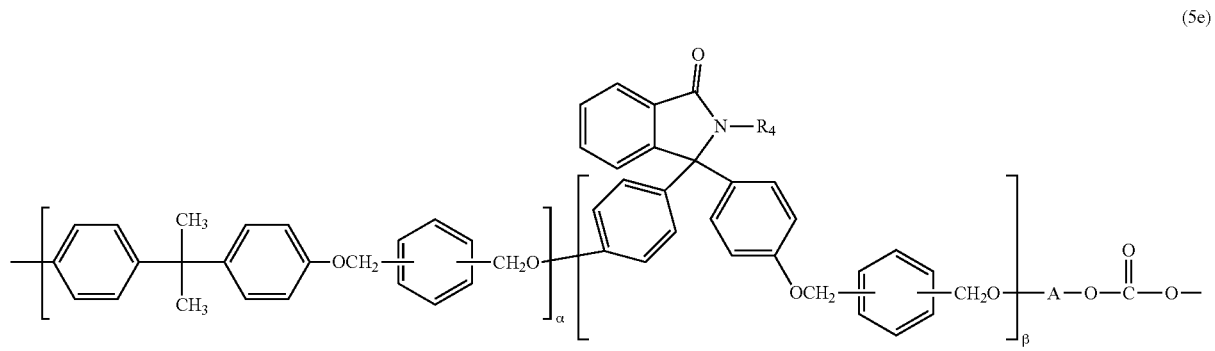

(5e)

wherein α is 1 to 10 and β is 1 to 10, provided that α+β is 2 to 10, and A is

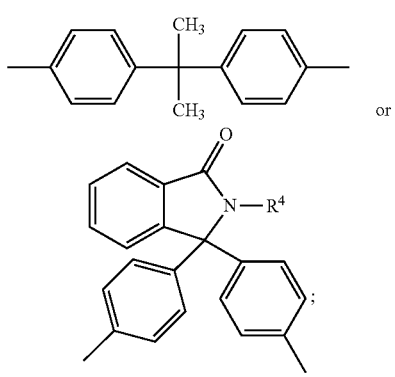

or a combination comprising at least one of the foregoing. The polycarbonate of formula (5e) is an example of a polycarbonate derived from an oligomer manufactured from two or more different bisphenols, i.e., a polyether oligomer of formula (1e). Polycarbonates can also be manufactured from two or more different polyether oligomers, for example a combination of polyether oligomers of formulas (1a) and (1b), or a combination of polyether oligomers of formulas (1a) and (1e).

"Polycarbonates" thus includes homopolycarbonates (wherein each carbonate repeating unit is the same), copolymers comprising different carbonate repeating units ("copolycarbonates"), and copolymers comprising carbonate units and other types of polymer units, such as ester units or siloxane units.

Copolymers comprising different carbonate repeating units can comprise bisphenol polyether carbonate units and non-bisphenol polyether carbonate units. Such units can be derived from the bisphenols of formula (3), 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like, catechol, hydroquinone, and substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. In an embodiment, the thermolytic and hydrolytic degradation products of the polycarbonates do not exhibit a half maximal inhibitory concentration ($IC_{50}$) less than 0.00025 M for alpha or beta in vitro estradiol receptors. According to further embodiments, thermolytic and hydrolytic degradation products derived from the non-bisphenol polyether units do not exhibit a half maximal inhibitory concentration ($IC_{50}$) less than 0.0003 M, 0.00035 M, 0.0004 M, 0.00045 M, 0.0005 M, 0.00075 M, or even 0.001 M, for alpha or beta in vitro estradiol receptors. The upper range of the $IC_{50}$ is not particularly limited, and in some embodiments cannot exceed the solubility limit of the thermolytic and hydrolytic degradation products derived from the non-bisphenol polyether units in the aqueous test solutions. In other embodiments, thermolytic and hydrolytic degradation products derived from the non-bisphenol polyether carbonate units do not exhibit any identifiable half maximal inhibitory concentration ($IC_{50}$) less than 0.00025 M, or greater than 0.001 M, for alpha and/or beta in vitro estradiol receptors.

A specific type of copolymer is a poly(ester-carbonate), also known as a polyester-polycarbonate. Such copolymers further contain, in addition to recurring carbonate units of formula (7), repeating units of formula (6)

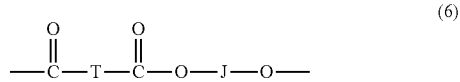
(6)

wherein J is a divalent group derived from a bisphenol polyether oligomer of formula (1); and T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Copolyesters containing a combination of different T and/or J groups can be used. The polyester units can be branched or linear.

In an embodiment, J is derived from a bisphenol polyether oligomer of formula (1), for example, an oligomer of formula (1a).

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In still other embodiments, thermolytic and hydrolytic degradation products derived from polycarbonate compositions do not exhibit any identifiable half maximal inhibitory concentration ($IC_{50}$) less than 0.00025 M, 0.0003 M, 0.00035 M, 0.0004 M, 0.00045 M, 0.0005 M, 0.00075 M, or even 0.001 M, for alpha and/or beta in vitro estradiol receptors. The upper range of the $IC_{50}$ is not particularly limited, and in some embodiments cannot exceed the solubility limit of the thermolytic and hydrolytic degradation products derived from polycarbonate compositions in the aqueous test solutions. In other embodiments, thermolytic and hydrolytic degradation products derived from polycarbonate compositions do not exhibit any identifiable half maximal inhibitory concentration ($IC_{50}$) less than 0.00025 M, or greater than 0.001 M, for alpha and/or beta in vitro estradiol receptors.

The molar ratio of ester units to carbonate units in the copolymers can vary broadly, for example 1:99 to 99:1, specifically 10:90 to 90:10, more specifically 25:75 to 75:25, or 2:98 to 15:85, depending on the desired properties of the final composition.

Polycarbonates and poly(ester-carbonate)s can be manufactured by processes such as interfacial polymerization and melt polymerization. Although the reaction conditions for interfacial polymerization can vary, an exemplary process generally involves dissolving or dispersing a bisphenol ether oligomer in aqueous caustic NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10.

The water-immiscible solvent can be, for example, methylene chloride, 1,2-dichloroethane, chlorobenzene, toluene, and the like.

Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on the each aryl, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

In the manufacture of poly(ester-carbonate)s by interfacial polymerization, rather than using the dicarboxylic acid or diol directly, the reactive derivatives of the diacid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4$NX, $(CH_3(CH_2)_3)_4$PX, $(CH_3(CH_2)_5)_4$NX, $(CH_3(CH_2)_6)_4$NX, $(CH_3(CH_2)_4)_4$NX, $CH_3(CH_3(CH_2)_3)_3$NX, and $CH_3(CH_3(CH_2)_2)_3$NX, wherein X is Cl⁻, Br⁻, a $C_{1-8}$ alkoxy or a $C_{6-18}$ aryloxy. An effective amount of a phase transfer catalyst can be 0.1 to 10 wt. %, or 0.5 to 2 wt. %, each based on the weight of dihydroxy compound in the phosgenation mixture.

An end-capping agent (also referred to as a chain stopper agent or chain terminating agent) can be included during polymerization to provide end groups. The end-capping agents (and thus end groups) are selected based on the desired properties of the polycarbonates. The end-capping agent limits molecular weight growth rate, and thus controls molecular weight in the polycarbonate. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and mono-chloroformates such as phenyl chloroformate, alkyl-substituted phenyl chloroformates, p-cumyl phenyl chloroformate, and toluene chloroformate. Combinations of different end groups can be used.

Preferred endcapping agents are selected such that any hydrolysis product of the selected chain stopper will not exhibit a half maximal inhibitory concentration ($IC_{50}$) less than 0.00025 M for alpha or beta in vitro estradiol receptors. For example, and without limitation, a suitable chain stopper is phenol or phenyl monochloroformate. Thus, when phenol is included as a chain stopper, the resulting polycarbonate comprises phenol as an end cap to the polymer chain.

Branched polycarbonate blocks can be prepared by adding a branching agent during polymerization. Preferred branching agents are selected such that any hydrolysis product of the selected chain stopper will not exhibit a half maximal inhibitory concentration ($IC_{50}$) less than 0.00025 M for alpha or beta in vitro estradiol receptors. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt. %. Combinations comprising linear polycarbonates and branched polycarbonates can be used.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 100,000 Daltons, specifically 10,000 to 80,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In some embodiments, the bisphenol polyether polycarbonates can have a glass transition temperature (Tg) of greater than 100° C., preferably greater than 135° C., for example 135 to 210° C. Tg can be determined by differential scanning calorimetry (DSC) per ASTM D7426 with a 20° C./min heating rate.

In an important feature, each of the thermolytic and hydrolytic degradation products of the polycarbonates does not exhibit a half maximal inhibitory concentration ($IC_{50}$) less than 0.00025 M for alpha or beta in vitro estradiol receptors. According to further embodiments, thermolytic and hydrolytic degradation products derived from polycarbonates do not exhibit a half maximal inhibitory concentration ($IC_{50}$) less than 0.0003 M, 0.00035 M, 0.0004 M, 0.00045 M, 0.0005 M, 0.00075 M, or even 0.001 M, for alpha or beta in vitro estradiol receptors. The upper range of the $IC_{50}$ is not particularly limited, and in some embodiments cannot exceed the solubility limit of the thermolytic and hydrolytic degradation products of the polycarbonates in the aqueous test solutions. In other embodiments, thermolytic and hydrolytic degradation products derived from the polycarbonates do not exhibit any identifiable half maximal inhibitory concentration ($IC_{50}$) less than 0.00025 M, or greater than 0.001 M, for alpha and/or beta in vitro estradiol receptors.

As used herein, "thermolytic and hydrolytic degradation product" is a degradation product arising from heat-, water-, or heat- and water-mediated degradation of polycarbonates under conditions of normal manufacture and especially use of the polycarbonates and articles made from the polycarbonates. Such conditions range from −40 to 150° C., from 0 to 100% relative humidity. Tests to determine thermal and hydrolytic stability are known in the art, and can be used to generate the thermolytic and hydrolytic degradation products. Thermolytic and hydrolytic degradation products can be generated in many different ways: for example, exposure of polycarbonate parts to steam or hot water in an autoclave or oven testing for chemical decomposition products over time. The conditions of exposure to moisture can be varied to include different pH as well as the presence of other additives such salts, soaps, water treatment chemicals, anti-scale additives, stabilizers, disinfectants and the like. Decomposition products may be determined in the polycarbonate part or those decomposition products extracted into the water. Analysis may be done by standard analytical techniques such as liquid and gas chromatography, infra-red spectroscopy, or ultraviolet spectroscopy. One such hydrolysis test is described in Polymer Engineering and Science, Vol. 22, April 1982, pp. 370-375. Another hydrolysis test protocol is described in is ASTM F1635-11. Hydrolysis testing of polymers varies widely with the end use needs of the polycarbonate. Without being bound by theory, it is believed that under thermolytic and hydrolytic degradation conditions, polycarbonates produce the bisphenol polyether oligomers, which are themselves thermolytically and hydrolytically stable. These oligomers are unlikely to show biological activity as they are too insoluble in biological systems to reach high problematic concentrations and too large to fit into estradiol binding sites.

Polycarbonates manufactured as described herein are suitable for use in a wide variety of compositions and applications as is known in the art. Thus, an additive composition can be added to the purified polycarbonate to form a polycarbonate composition. The additive composition can comprise one or more additives selected to achieve a desired property, with the proviso that the additive(s) are also selected so as to not significantly adversely affect a desired property of the polycarbonate composition. In particular, any thermolytic and hydrolytic degradation products derived from each of the additives in the polycarbonate compositions do not exhibit a half maximal inhibitory concentration ($IC_{50}$) less than 0.00025 M, 0.0003 M, 0.00035 M, 0.0004 M, 0.00045 M, 0.0005 M, 0.00075 M, or even 0.001 M, for alpha and/or beta in vitro estradiol receptors. The upper range of the $IC_{50}$ is not particularly limited, and in some embodiments cannot exceed the solubility limit of the thermolytic and hydrolytic degradation products derived from each of the additives in the aqueous test solutions. In other embodiments, thermolytic and hydrolytic degradation products derived from each of the additives do not exhibit any identifiable half maximal inhibitory concentration ($IC_{50}$) less than 0.00025 M, or greater than 0.001 M, for alpha and/or beta in vitro estradiol receptors. The additive composition or individual additives can be mixed at a suitable time during the mixing of the components for forming the composition. The additive can be soluble and/or non-soluble in polycarbonate.

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt. %, or 0.01 to 5 wt. %, each based on the total weight of the polymer in the composition.

Suitable impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butylene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like.

Any one or more of the additives, for example heat stabilizers or flame retardants, can be provided as a phosphorous-containing compound. Exemplary phosphorous containing compounds including phosphites, phosphonates, phosphates, or a combination thereof. Examples of phosphite additives include diphenyl ($C_{1-18}$)alkyl phosphites, phenyl di($C_{1-18}$)alkyl phosphites, tri($C_{1-18}$)alkyl phosphites, triphenyl phosphites, diphenyl pentaerythritol diphosphite, or any combination thereof, wherein the phenyl groups can be substituted or unsubstituted, for example tris-(2,6-dimethylphenyl)phosphite, and tris-(mixed mono- and di-nonylphenyl)phosphite. In various embodiments, a phosphite or phosphonate or mixture thereof the additive can be present in an amount of, for example, from about 0.00001 wt. % to about 0.3 wt. %, or from about 0.0001 wt. % to about 0.01 wt. %. In other embodiments, a phosphite additive can have a molecular weight (Mw) of greater than about 200 Daltons.

Examples of phosphate additives include triphenyl phosphate, resorcinol phenyl diphosphate, spirobiindane phenyl diphosphate, di-tert-butyl hydroquinone phenyl diphosphate, biphenol phenyl diphosphate, bisphenol A bis(diphenyl phosphate), hydroquinone phenyl diphosphate, or any combination thereof. In various embodiments, the phosphates can be useful in flame retardant polycarbonate blends, such as, for example, PC-ABS, PC-MBS, or PC-ABS-MBS blends. In an embodiment, an aryl phosphate can be used at, for example, 1 to 30 wt. % of the composition, or 5 to 20 wt. % of the composition. In yet other embodiments, the aryl phosphate will have a molecular weight of about 300 Daltons to about 1500 Daltons. It should also be understood that, in view of this disclosure, any other suitable phosphorous-containing additive, or thermolysis or hydrolysis degradation product thereof, exhibiting a lack of estradiol binding activity characterized by the half maximal inhibitory concentration values described above can used.

The polycarbonate compositions can comprise a colorant, for example Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, Pigment Black 6, titanium dioxide, and a combination comprising at least one of the foregoing.

The polyether polycarbonate compositions can further comprise an additional polymer that is a non-polyether polycarbonate, in a weight ratio of polyether polycarbonate: additional polymer of 1:99 to 99:1, or 10:90 to 90:10 or 20:80 to 80:20, for example. The additional or second (or more) polymer can comprise a polycarbonate, polyester, polyolefin, polyetherimide, styrene-acrylonitrile, acrylonitrile-butadiene-styrene, methyl methacrylate, methyl methacrylate-butadiene-styrene, styrene-maleic anhydride, styrene-butadiene-styrene, styrene-ethylene-butylene-styrene, polystyrene, or a combination comprising at least one of the foregoing. Preferably, thermolytic and hydrolytic degradation products derived from the additional polymer do not exhibit a half maximal inhibitory concentration ($IC_{50}$) less than 0.00025 M for alpha or beta in vitro estradiol receptors. According to further embodiments, thermolytic and hydrolytic degradation products derived from the additional polymer do not exhibit a half maximal inhibitory concentration ($IC_{50}$) less than 0.0003 M, 0.00035 M, 0.0004 M, 0.00045 M, 0.0005 M, 0.00075 M, or even 0.001 M, for alpha or beta in vitro estradiol receptors.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming Shaped, formed, or molded articles comprising the polycarbonate compositions are also provided. The polycarbonate compositions can be molded into useful shaped articles by a variety of methods, such as injection molding, extrusion, rotational molding, blow molding, and thermoforming. Some example of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In addition, the polycarbonate compositions are especially useful for food contact and medical applications. Food contact applications include articles such as containers, especially re-usable containers, and are subject to cleaning or autoclaving, and medical applications where the articles are subject to cleaning or autoclaving.

Thermolytic and hydrolytic degradation products derived from the polycarbonate compositions or articles comprising the polycarbonate compositions do not exhibit a half maximal inhibitory concentration ($IC_{50}$) less than 0.00025 M for alpha or beta in vitro estradiol receptors. According to further embodiments, thermolytic and hydrolytic degradation products derived from polycarbonate compositions or articles do not exhibit a half maximal inhibitory concentration ($IC_{50}$) less than 0.0003 M, 0.00035 M, 0.0004 M, 0.00045 M, 0.0005 M, 0.00075 M, or even 0.001 M, for alpha or beta in vitro estradiol receptors. The upper range of the $IC_{50}$ is not particularly limited, and in some embodiments cannot exceed the solubility limit of thermolytic and hydrolytic degradation products derived from polycarbonate compositions or articles in the aqueous test solutions. In other embodiments, thermolytic and hydrolytic degradation products derived from polycarbonate compositions or articles do not exhibit any identifiable half maximal inhibitory concentration ($IC_{50}$) less than 0.00025 M, or greater than 0.001 M, for alpha and/or beta in vitro estradiol receptors.

The bisphenol polyether oligomers, polycarbonates, and polycarbonate compositions are further illustrated by the following non-limiting examples.

EXAMPLES

Example 1. Synthesis of BPA Polyether Oligomer from α, α'-dibromo-p-xylene

Bisphenol A (BPA) (17 grams), dibromo-p-xylene (10 grams), dimethyl sulfoxide (DMSO, 40 ml), tetrahydrofuran (THF, 20 ml), and KOH (60 mL, 50 aq. %) were charged into a three-neck flask equipped with a mechanical stirrer and a thermocouple. The reaction mixture was heated at 60° C. for 16 hours. A small sample was taken from the reaction, neutralized with acetic acid and an ultra-high performance liquid chromatography ("UPLC") spectrum showed the peaks for BPA, BPA ether dimer (n=1), and BPA ether trimer (n=2). After cooling, 30 ml of acetic acid was added to the flask to adjust the pH to 6. The crude reaction mixture was mixed with methanol, stirred for approximately 1 hour, and then filtered using #4 filter paper in a Buchner funnel UPLC was run on the filtered solids. There was a marked decrease of BPA (n=0) peak compared to the previous small sample from the reaction mixture. The acidification with acetic acid and addition of methanol allowed the removal of >95% of the unreacted BPA giving purified phenolic capped polyether oligomers. Solids were further washed with methanol, and then stirred in methanol overnight. UPLC of the filtered solids showed only 0.99 area % of BPA peak. Further methanol treatment followed by filtration gave additional reduction of free BPA, in some instances to less than 100 ppm. UPLC showed no indication (less than 1%) of cyclic oligomers.

GPC (methylene chloride solution) showed normal distribution for the polyether oligomers with weight average molecular weight ("Mw") of 998 g/mol and number average molecular weight ("Mn") of 636 g/mol using polycarbonate standards. Trimer peak was the largest peak. The solids were dried in an oven overnight at 60° C. Proton NMR was run and showed both xylene methylene protons and BPA methyl group signals in the expected ratio of about 4:3. Bromomethylene (phenyl-$CH_2$—Br) signals and aliphatic hydroxymethylene (phenyl-$CH_2$—OH) signal from potential hydrolysis of the bromoxylene functionality were not detected (less than 1000 ppm). The methanol-washed polyether oligomers had high level of phenolic end groups (>95%) with less than 100 ppm BPA.

Example 2. Synthesis of BPA Polyether Oligomer from α, α'-dichloro-p-xylene

BPA (21 grams), dichloro-p-xylene (7 grams), DMSO (60 ml), THF (30 ml), and KOH (62 grams, 50 aq. %) were charged into a three-neck flask equipped with a mechanical stirrer and a thermocouple. The reaction mixture was heated at 60° C. for approximately 16 hours then cooled to room temperature. Acetic acid (40 ml) was added to neutralize the crude product to a pH of 6. UPLC was run on a small sample showing peaks for BPA, BPA ether dimer, and BPA ether trimer. Methanol was added. The mixture was stirred for approximately 1 hour then filtered using #4 filter paper. UPLC was run on the filtered solids which showed a marked decreased of BPA (n=0) peak as compared to the small reaction mixture sample. After three methanol washes, solids had less than 1% of BPA on UPLC. GPC of the polyether oligomers showed normal distribution curve and Mw of 1167 and Mn of 713 using polycarbonate standards. The dimer peak appeared to be larger than the trimer peak on UPLC. It was noted that when the solids were further washed with water, the pink color was removed and a white powder was obtained.

Example 3. Purification of Polyether Oligomers

As described above, washing the polyether oligomers with methanol at room temperature (23° C.) was effective in removing BPA (n=0). BPA extraction and removal was more effective with a finely divided powder providing more surface area and solvent access. When hot methanol was used (>50° C.) not only was BPA removed but the n=1 dimer also dissolved into solution. The higher Mw polyether oligomer fraction n>2 was still insoluble. When the methanol oligomer mixture was filtered hot (>50° C.) the solid oligomers were isolated with no detectable BPA and no detectable n=1 dimer. When the hot methanol solution was cooled the n=1 dimer (BPA-X-1) precipitated from solution while the BPA remained dissolved. Thus it was possible to remove BPA, isolate a pure n=1 (dimer) portion and a higher n>2 oligomer content. The purified n=1 dimer and the higher oligomers were analyzed for estrogenic activity as described below.

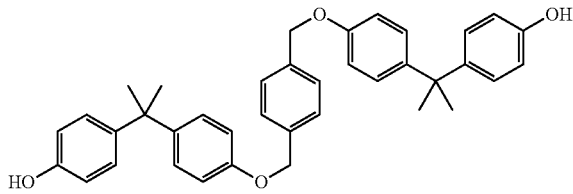 [SMILES: CC(C)(c1ccc(O)cc1)c1ccc(OCc2ccc(COc3ccc(C(C)(C)c4ccc(O)cc4)cc3)cc2)cc1]

BPA-X-1=BPA Xylene dimer (n=1) is 4,4'-[1,4-Phenylenebis(methyleneoxy-4,1-phenylene(1-methylethylidene))] bisphenol FW=558 g/mol (GPC).

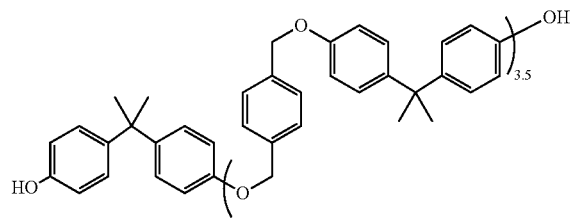

BPA-X-3.5=BPA Xylene oligomer (n=3.5) is 1,4-Bis(chloromethyl)benzene-bisphenol A copolymer FW=1345 g/mol (GPC).

Example 4. Evaluation of Phenolic Compounds and Polyether Oligomers

Estradiol Binding: Utilizing a conventional in vitro competitive binding assay, estradiol binding activity was quantified by the half maximal inhibitory concentration ($IC_{50}$) value, which was evaluated for various phenolic compounds capable for use as component starting materials in the manufacture of polyether carbonate compositions.

Polyether oligomers and other phenolic materials mimic or replicate various chemical species that could be produced under some conditions, for example high (pH=8 to 12) or low (pH=1 to 6) pH, as hydrolysis degradation products derived from polycarbonates comprising the component starting materials. Specifically, ($IC_{50}$) binding concentrations for both the alpha or beta in vitro estradiol receptors for various compounds in Table 1 were tested. A set of tests were run using a standard competitive estradiol binding assay. Samples were dissolved in DMSO. The various phenolic compounds were then tested at up to seven different concentrations for each test phenolic compound. Each of those tests was run in triplicate. Tests were conducted by displacement of a radio-ligand. A 17b-estradiol control sample was run to ensure proper binding of the natural hormone under the test conditions.

The phenolic compounds or polyether oligomers (Table 1) were investigated as to their binding affinity for recombinant human estradiol receptors (rhER) alpha (α) and beta 1 (β1) in vitro. 17β-Estradiol ($E_2$) was used as a standard whose relative binding affinity was defined as 100%. Competitive binding assays were performed by incubating rhER alpha (α) and beta 1 (β1) with 10 nM [$^3$H]estradiol (the radio ligand) in the presence or absence of increasing concentrations, 0.25 to 250,000 nM, of the test compounds of Table 1 (nM is nano molar). Each data point is the average of at least two assays. Stock solutions of the compounds of Table 1 were prepared at 10× E-2 M in 100% DMSO (dimethyl sulfoxide). The BPA xylene dimer (BPA-X-1) and BPA xylene oligomers (BPA-X-3.5) as described in Example 2 were compared with BPA, p-cumyl phenol, phenol and an estradiol control. The compounds were diluted 10 fold in binding buffer and then 1:4 in the final assay mix. The final concentration of DMSO in the assay well was 5%. In some instances the highest concentration of the test compound was 2.5×E-4 M (250,000 nM). In some instances the compounds of Table 1 were tested at seven concentrations over log increments. The lowest concentration was 2.5×E-10 M (0.25 nM). The IC50 is the concentration of test substance at which about 50% of the radio labeled estradiol was displaced from the estradiol receptor.

Binding assays were run under standard conditions as follows: purified recombinant human (rh) ERα and rhERβ were incubated with 10 nM $^3$H-estradiol in 10 mM Tris, pH 7.5, 10% glycerol, 1 mg/ml ovalbumin and 2 mM dithiothreitol (DTT) to measure total binding. The phenolic test compounds were added at several concentrations. Samples were incubated at 4° C. overnight. $^3$H-E2-ER complexes were separated from unbound radioligand by addition of 50% aq. hydroxy apatite, filtration, and washing. All incubations were run in triplicate. Samples were analyzed using a LKB Wallac Rackbeta model 1209 liquid scintillation counter.

Surprisingly under conditions where the parent compound (BPA) was seen to bind to both receptors (see Table 1), the phenolic oligomers derived from BPA, i.e., BPA xylene dimer (n=1), and BPA xylene oligomer (n~3.5) gave no detectable binding, even at the highest concentration. That is, no binding can be measured using standard biochemical analysis techniques to test estradiol binding activity. Even at a concentration of 2.5×E-4 M there was no displacement of estradiol. Higher concentrations, larger values of IC50, indicate less binding affinity (the test compound is less estradiol like in cell binding).

The BPA xylene oligomer (n=3.5) did not completely dissolve at all concentrations. At the concentrations tested it showed no binding. The low solubility of the polyether oligomers is yet a further indication that it is unavailable under normal biological conditions to take part in any binding to any endocrine receptor.

TABLE 1

| | Estradiol Competition | | |
|---|---|---|---|
| Example | Compounds | $IC_{50}$ rhER alpha | $IC_{50}$ rhER beta |
| Control A | 17b-estradiol control (CAS#5028-2) | 1.0 × E-9 | 8.2 × E-9 |
| Control B | Bisphenol A | 2.0 × E-4 | 4.5 × E-6 |
| Control C | p-Cumyl Phenol | 1.4 × E-4 | 9.8 × E-6 |
| BPA-X-1 | BPA-Xylene dimer n = 1 | >2.5 × E-4 | >2.5 × E-4 |
| BPA-X-3.5 | BPA-Xylene oligomers n = 3.5 | >2.5 × E-4 | >2.5 × E-4 |
| Phenol | Phenol (polycarbonate end cap) | >2.5 × E-4 | >2.5 × E-4 |

Notes
$IC_{50}$ is the concentration of the candidate that displaces 50% of the radioactive ligand from the rhER cells
>2.5 × 10$^4$ compounds did not compete to the extent of 50% with radiolabeled 17B-estradiol at the highest conc. (250,000 nM) tested; no IC50 can be determined It was also noted that estradiol binds at very low concentrations of 1.0 to 8.2×E-9 M in control experiment A and is much more active, by over 4 orders of magnitude, than any of the compounds tested including BPA (example B). In these tests BPA and p-cumyl phenol (example C) have a very low level of binding, the polyether oligomers have a non-detectable level of binding.

Example 5. Synthesis of Polycarbonate from BPA Polyether Oligomer

Methylene chloride (500 ml), water (300 ml), BPA-xylene methanol washed polyether oligomer from Example 1 (9 grams), and triethylamine ("TEA") (0.1 ml) were charged into a 2 L flask equipped with mechanical stirrer, chilled ethylene glycol condenser, pH probe, and caustic (NaOH) scrubbers for vent gas. The mixture was stirred for approximately 10 minutes to allow the larger clumps of oligomer to disperse prior to phosgenation. Phosgene was added for 10 min. at 1 g/min rate while 30 wt. % aqueous NaOH was added as necessary to maintain a pH of 9. A reaction sample of the polyether carbonate had an Mw of about 24,000 determined by GPC using polycarbonate standards. This showed that the lower molecular weight polyether oligomers were capable of building to a high Mw polycarbonate indicating a high level of reactive diphenolic end caps of the polyether oligomer.

The crude product was allowed to separate into two phases. The organic phase was separated, washed with 1N HCl, then three times with water. Hot water precipitation was used to isolate the polymer from solution; dropwise addition of the methylene chloride solution of the polymer to boiling water caused the methylene chloride solvent to flash from the mixture leaving a polymer powder suspended in water. The polyether carbonate powder was filtered from the water and dried in an oven overnight at 60° C. The dried polymer powder had a Tg of 105° C. as determined by DSC as per ASTM D7426 with a 20° C./min heating rate. Tg was measured on second heat. The polyether polycarbonate containing polymer could be melt processed into a clear flexible film. In some instances the polyether carbonate has a chloride content of less than 20 ppm, a phenolic end group content of less than 20 meq/Kg polymer, a transition metal content of less than 20 ppm, and a residual phenolic monomer content of less than 100 ppm.

Example 6. Synthesis of Mixed BPA N-phenyl Phenolphthalein Bisphenol Polyether Oligomer from α, α'-dichloro-p-xylene BPA (70 grams), dichloro-p-xylene (35 grams), and 42 g N-phenyl phenolphthalein-p,p-bisphenol (P3BP), DMSO (300 ml), THF (150 ml), and KOH (300 grams, 50 aq. % solution) were charged into a three-neck flask equipped with a mechanical stirrer and a thermocouple. The reaction mixture was heated at 60° C. for approximately 16 hours then cooled down to room temperature. Acetic acid (40 ml) was added to neutralize the crude product to a pH of 6. UPLC was run on a small sample showing peaks for BPA, P3BP, BPA-P3BP dimer, and higher oligomers. Water and methanol were added. The mixture was stirred for approximately 1 hour then filtered using #4 filter paper. The filtrate was further washed with methanol. The solid was then suspended in methanol at room temp and stirred for several hours. After three methanol washes, the oligomers had less than 1% of BPA by UPLC analysis. GPC of the yellow polyether oligomers showed normal distribution curve and Mw of 1215 Daltons and Mn of 687 Daltons using polycarbonate standards. The dimer peak appeared to be larger than the trimer peak on UPLC. $^1$HNMR analysis showed the polyether oligomer to be ~35% P3BP. No peaks related to cyclic oligomer were observed. Chloro methylene (phenyl-$CH_2$—Cl) signals and aliphatic hydroxyl methylene (Phenyl-$CH_2$—OH) signal from potential hydrolysis of the chloro xylene functionality, were not detected (less than 1000 ppm). The methanol washed polyether oligomers had high level of phenolic end groups (>95%) with less than 100 ppm BPA.

Example 7. Synthesis of Polycarbonate from BPA-N-phenyl Phenolphthalein Bisphenol (P3BP) Polyether Oligomer Methylene chloride (500 ml), water (300 ml), BPA-P3BP methanol washed polyether oligomer from Example 6 (9 grams), and triethylamine ("TEA") (0.1 ml) were charged into a 2 L flask equipped with mechanical stirrer, chilled ethylene glycol condenser, pH probe, and caustic (NaOH) scrubbers for vent gas. The mixture was stirred for approximately 10 minutes to allow the larger clumps of oligomer to disperse prior to phosgenation. Phosgene was added for 10 min. at 1 g/min rate while 30 wt. % aqueous NaOH was added as necessary to maintain a pH of 9. A reaction sample from the mixture had a Mw of about 32,000, Mn about 13,000 as determined by GPC using polycarbonate standards. This showed that the lower molecular weight polyether BPA-P3BP oligomers were capable of building to a high Mw polycarbonate indicating a high level of reactive diphenolic end caps of the polyether oligomer.

The crude product was allowed to separate into two phases. The organic phase was separated, washed with 1N HCl, then three times with water. Hot water precipitation was used to isolate the polymer from solution; dropwise addition of the methylene chloride solution of the polymer to boiling water, caused the methylene chloride solvent to flash from the mixture leaving a polymer powder suspended in water. The polymer powder was filtered from the water and dried in an oven overnight at 60° C. The dried polymer powder had a Tg of 143° C. as determined by DSC as per ASTM D7426 with a 20° C./min heating rate. Tg was measured on second heat. The polyether polycarbonate polymer, which had a higher heat capability than its BPA parent (Example 5) could be melt processed into a clear flexible film.

The singular forms "a," "an," and "the" include plural referents unless the context clearly dictates otherwise. "Or" means "and/or." The modifier "about" used in connection with a quantity is inclusive of the stated value and has the meaning dictated by the context (e.g., includes the degree of error associated with measurement of the particular quantity). The endpoints of all ranges directed to the same component or property are inclusive and independently combinable (e.g., ranges of "less than or equal to 25 wt. %, or 5 wt. % to 20 wt. %," is inclusive of the endpoints and all intermediate values of the ranges of "5 wt. % to 25 wt. %," etc.). The suffix "(s)" is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylarylene" refers to an arylene group that has been substituted with an alkyl group as defined above, with 4-methylphenylene being an exemplary alkylarylene group; "arylalkylene" refers to an alkylene group that has been substituted with an aryl group as defined above, with benzyl being an exemplary arylalkylene group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$) alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of producing an article having low estradiol binding activity, the method comprising:
   providing a bisphenol polyether oligomer composition that does not exhibit a half maximal inhibitory concentration (IC50) less than 0.00025M for alpha or beta in vitro estradiol receptors, the bisphenol polyether oligomer composition comprising greater than 90 wt. % of an oligomer of the formula:

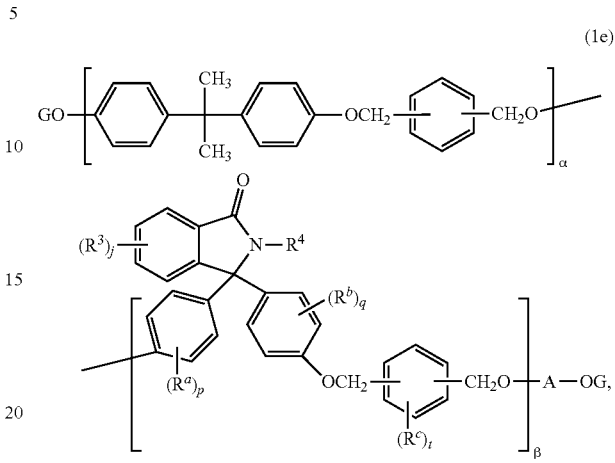

wherein
$R^a$, $R^b$, and $R^c$ are each independently a $C_{1-12}$ alkyl, $C_{1-12}$ alkoxy, or $C_{1-12}$ alkylarylene,
$R^3$ is each independently a $C_{1-6}$ alkyl,
$R^4$ is hydrogen, $C_{1-6}$ alkyl, or a substituted or unsubstituted phenyl,
p, q, j, and t are each independently integers of 0 to 4,
α is 1 to 10 and β is 1 to 10, provided that α+β is 2 to 10,
G is H or

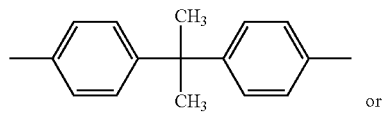

and
A is

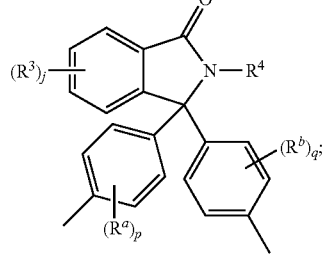

and
manufacturing the article with a polycarbonate composition comprising a polyether polycarbonate having repeating carbonate units derived from the bisphenol polyether oligomer composition.

2. The method of claim 1, wherein the bisphenol polyether oligomer composition further comprises a bisphenol polyether oligomer of the formula

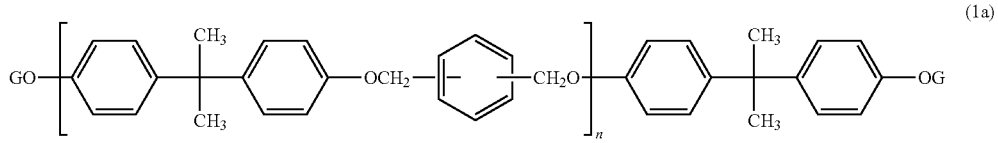

(1a)

wherein G is H or

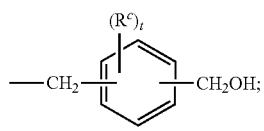

and n is 1 to 10.

3. The method of claim 1, wherein $R^4$ is methyl or phenyl, and p, q, j, and t are 0.

4. The method claim 1, wherein the polyether polycarbonate comprises from 5 to 500 of the repeating carbonate units derived from the bisphenol polyether oligomer composition.

5. The method of claim 1, wherein the polyether polycarbonate has a glass transition temperature of greater than 135° C.

6. The method of claim 1, wherein the endcap of the polyether polycarbonate is a phenoxy group.

7. The method of claim 1, wherein the polyether polycarbonate further has
a weight average molecular weight of 3,000 to 80,000 Daltons, as measured by gel permeation chromatography (GPC), using a crosslinked styrene-divinylbenzene column and calibrated to polycarbonate references,
a phenolic end group content less than 20 meq/kg,
a total chloride content less than 50 ppm,
a transition metal content less than 50 ppm, and
a residual phenolic monomer content less than 100 ppm.

8. The method claim 1, wherein the polyether polycarbonate is a poly(ester carbonate) comprising repeating carbonate units derived from the bisphenol polyether oligomer composition and repeating ester units derived from a dicarboxylic acid or a reactive derivative of the dicarboxylic acid.

9. The method claim 8, wherein the dicarboxylic acid is an isophthalic acid, terephthalic acid, or a combination comprising at least one of the foregoing, and the reactive derivative of the dicarboxylic acid is isophthaloyl dichloride, terephthaloyl dichloride, or a combination comprising at least one of the foregoing.

10. The method of claim 1, wherein the polycarbonate composition further comprises one or more additives.

11. The method of claim 10, wherein the additive is a stabilizer, antioxidant, colorant, impact modifier, flame retardant, anti-drip additive, mold release additive, lubricant, plasticizer, mineral, reinforcement additive, or a combination comprising at least one of the foregoing.

12. The method of claim 11, wherein the additive is a phosphorus compound.

13. The method of claim 11, wherein the additive is a phosphite.

14. The method of claim 11, wherein the polycarbonate composition further comprises a second polymer component comprising a non-polyether polycarbonate polymer.

15. The method of claim 14, wherein the second polymer component comprises a polycarbonate, polyester, polyolefin, polyetherimide, styrene-acrylonitrile, acrylonitrile-butadiene-styrene, methyl methacrylate, methyl methacrylate-butadiene-styrene, styrene-maleic anhydride, styrene-butadiene-styrene, styrene-ethylene-butylene-styrene, polystyrene, or a combination comprising at least one of the foregoing.

* * * * *